US010488575B2

(12) United States Patent
Liu et al.

(10) Patent No.: US 10,488,575 B2
(45) Date of Patent: Nov. 26, 2019

(54) DISPLAY APPARATUS WITH LIGHT SOURCE MODULE HAVING LIGHT TURNING FILM WITH MICRO STRUCTURES WITH DIFFERENT HEIGHTS

(71) Applicant: Nano Precision Taiwan Limited, Hsinchu County (TW)

(72) Inventors: Ming-Dah Liu, Hsin-Chu (TW); Chao-Hung Weng, Hsin-Chu (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 444 days.

(21) Appl. No.: 15/403,195

(22) Filed: Jan. 11, 2017

(65) Prior Publication Data

US 2017/0212297 A1 Jul. 27, 2017

(30) Foreign Application Priority Data

Jan. 26, 2016 (CN) .......................... 2016 1 0051091

(51) Int. Cl.
*F21V 5/02* (2006.01)
*F21V 8/00* (2006.01)
*G02B 5/02* (2006.01)

(52) U.S. Cl.
CPC ......... *G02B 6/0053* (2013.01); *G02B 5/0231* (2013.01); *G02B 6/0038* (2013.01)

(58) Field of Classification Search
CPC ...... F21V 5/005; F21V 5/02; G02F 1/133615; G02B 6/0011; G02B 6/005; G02B 6/0053
See application file for complete search history.

(56) References Cited

U.S. PATENT DOCUMENTS

| | | | | |
|---|---|---|---|---|
| 5,600,462 A | * | 2/1997 | Suzuki | F21V 5/02 |
| | | | | 349/112 |
| 5,771,328 A | * | 6/1998 | Wortman | F21V 5/02 |
| | | | | 385/146 |
| 5,828,488 A | * | 10/1998 | Ouderkirk | B29C 55/023 |
| | | | | 359/485.02 |
| 5,919,551 A | * | 7/1999 | Cobb, Jr. | G02B 5/00 |
| | | | | 359/530 |

(Continued)

FOREIGN PATENT DOCUMENTS

| CN | 101535880 | 9/2009 |
|---|---|---|
| CN | 102053418 | 5/2011 |

(Continued)

OTHER PUBLICATIONS

"Office Action of China Counterpart Application", dated Jun. 4, 2019, pp. 1-9.

*Primary Examiner* — Ismael Negron
(74) *Attorney, Agent, or Firm* — JCIPRNET (57) ABSTRACT

A light turning film includes a light incident surface with first and second pluralities of first optical microstructures and a plurality of second optical microstructures; and a light emitting surface opposite to the light incident surface. The first optical microstructures and the second optical microstructures protrude outward from the light turning film, such that the height of one of the first and second optical structures is equal to or less than two thirds of the height of the other one of the first and second optical structures. The light turning film might be included in a light source module for a display apparatus.

21 Claims, 6 Drawing Sheets

(56) References Cited

U.S. PATENT DOCUMENTS

| | | | |
|---|---|---|---|
| 6,390,638 B1 * | 5/2002 | Miller | G02B 6/0055 |
| | | | 362/23.13 |
| 6,456,437 B1 * | 9/2002 | Lea | F21V 5/02 |
| | | | 359/625 |
| 6,497,946 B1 * | 12/2002 | Kretman | C08J 5/18 |
| | | | 428/317.9 |
| 6,746,130 B2 | 6/2004 | Ohkawa | |
| 6,893,136 B2 * | 5/2005 | Yang | G02F 1/13362 |
| | | | 349/65 |
| 6,975,455 B1 * | 12/2005 | Kotchick | G02B 5/305 |
| | | | 359/485.03 |
| 7,529,048 B2 * | 5/2009 | Lin | G02B 5/04 |
| | | | 359/625 |
| 7,713,597 B2 * | 5/2010 | Jones | G02B 5/0226 |
| | | | 264/337 |
| 8,305,511 B2 * | 11/2012 | Shiau | G02B 5/045 |
| | | | 349/15 |
| 2006/0087743 A1 | 4/2006 | Choi et al. | |
| 2011/0002144 A1 * | 1/2011 | Park | G02B 5/02 |
| | | | 362/620 |

FOREIGN PATENT DOCUMENTS

| | | |
|---|---|---|
| CN | 202229028 | 5/2012 |
| CN | 103676311 | 3/2014 |
| JP | 2001166116 | 6/2001 |
| TW | 201133082 | 10/2011 |

* cited by examiner

DISPLAY APPARATUS WITH LIGHT SOURCE MODULE HAVING LIGHT TURNING FILM WITH MICRO STRUCTURES WITH DIFFERENT HEIGHTS

CROSS-REFERENCE TO RELATED APPLICATION

This application claims the priority benefit of China application serial no. 201610051091.0, filed on Jan. 26, 2016. The entirety of the above-mentioned patent application is hereby incorporated by reference herein and made a part of this specification.

BACKGROUND OF THE INVENTION

Field of the Invention

The invention relates to an optical module, an optical apparatus and an optical film, and particularly relates to a light source module, a display apparatus and a light turning film.

Description of Related Art

Generally, a display apparatus includes a display panel and a light source module. The light source module is configured to provide a light source required when the display panel displays images. According to the existing technique, a light turning film in the light source module may change a direction of a light beam leaving a light guide plate (LGP) in a low angle, so as to propagate the light beam towards the display panel. A surface of the light turning film facing the LGP only includes optical microstructures with a same single structure. Although the light turning film may be used to change a propagating direction of the light beam leaving the LGP, when it is used in collaboration with a dual brightness enhancement film (DBEF), the light beam reflected by the DBEF has a total reflection in internal of the optical microstructures with the same single structure, and again enters the LGP in a low angle, and the light beam is propagated in internal of the LGP, and is reflected back to the position of the light source to leave the LGP, and is not reflected back to the DBEF. Therefore, according to the existing technique, the light turning film cannot effectively improve an optical luminance of the light source module and decrease the power consumption of the light source module.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a light source module having a high optical luminance and low power consumption.

The invention is directed to a display apparatus, a light source module of the display apparatus has a high optical luminance and low power consumption.

The invention is directed to a light turning film, and the light turning film increases an optical luminance of a light source module and decreases power consumption thereof.

Other objects and advantages of the invention may be further illustrated by the technical features broadly embodied and described as follows.

In order to achieve one or a portion of or all of the objects or other objects, an embodiment of the invention provides a light source module including a light source, a light guide plate, a light turning film and a dual brightness enhancement film (DBEF). The light source is adapted to provide a light beam. The light guide plate has a light incident surface and a light emitting surface, and is adapted to guide the light beam. The light beam enters the light guide plate through the light incident surface, and leaves the light guide plate through the light emitting surface. The light turning film is disposed above the light guide plate. The DBEF is disposed on the light turning film. The light turning film includes a plurality of first optical microstructures and a plurality of second optical microstructures. The first optical microstructures and the second optical microstructures protrude towards the light guide plate from a reference plane. Each of the first optical microstructures and each of the second optical microstructures is complied with conditions of $$0 < H2 \leq \frac{2}{3}H1$$

and 80 degrees≤θ≤100 degrees, where H1 is a height of each of the first optical microstructures protruding out of the reference plane, H2 is a height of each of the second optical microstructures protruding out of the reference plane, and θ is a vertex angle of each of the second optical microstructures.

In order to achieve one or a portion of or all of the objects or other objects, another embodiment of the invention provides a display apparatus including a display panel and the aforementioned light source module. The display panel is adapted to display an image. The light source module is adapted to provide the light beam to serve as a display light source of the display panel.

In order to achieve one or a portion of or all of the objects or other objects, another embodiment of the invention provides a light turning film including a light incident surface and a light emitting surface. The light incident surface includes a plurality of first optical microstructures and a plurality of second optical microstructures. The light incident surface is adapted to guide a light beam to enter the light turning film through the light incident surface. The light emitting surface is disposed opposite to the light incident surface, and is adapted to guide the light beam to leave the light turning film through the light emitting surface. The first optical microstructures and the second optical microstructures protrude outward from the light turning film with reference of a reference plane. Each of the first optical microstructures and each of the second optical microstructures is complied with conditions of $$0 < H2 \leq \frac{2}{3}H1$$

and 80 degrees≤θ≤100 degrees, where H1 is a height of each of the first optical microstructures protruding out of the reference plane, H2 is a height of each of the second optical microstructures protruding out of the reference plane, and θ is a vertex angle of each of the second optical microstructures.

According to the above descriptions, the embodiments of the invention have at least one of the following advantages or effects. Protruding heights and vertex angles of the optical microstructures of the embodiments of the invention are complied with the predetermined conditions, so that the light turning film may improve the optical luminance of the light source module to decrease the power consumption thereof.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
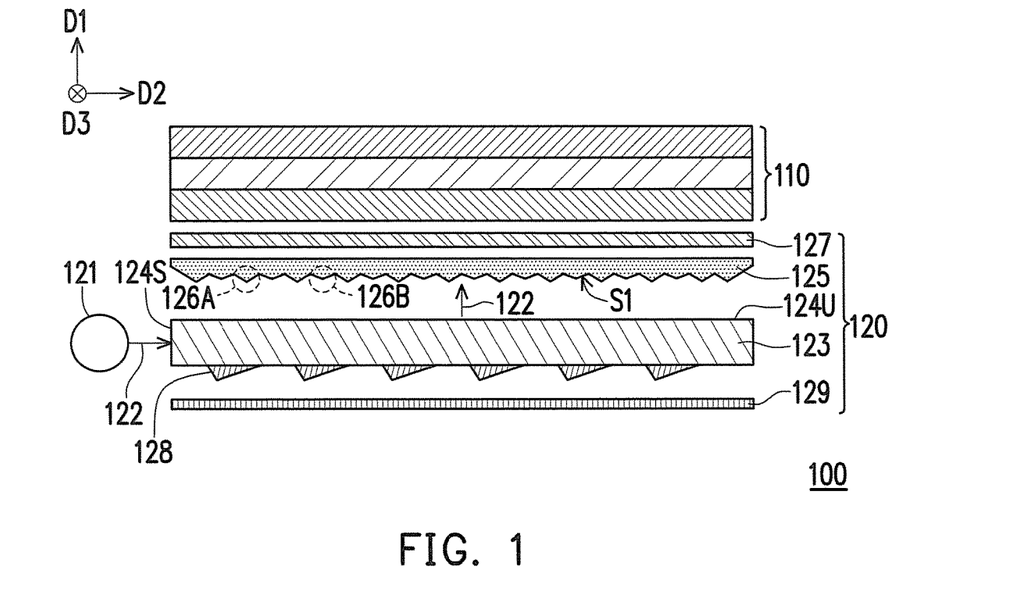
FIG. 1 is a schematic diagram of a display apparatus according to an embodiment of the invention.

FIG. 1 is a schematic diagram of a display apparatus according to an embodiment of the invention. Referring to FIG. 1, the display apparatus 100 of the embodiment includes a display panel 110 and a light source module 120. In the embodiment, the display panel 110 is adapted to display an image. The light source module 120 is adapted to provide a light beam to serve as a display light source of the display panel 110.

To be specific, the light source module 120 of the embodiment includes a light source 121, a light guide plate (LGP) 123, a light tuning film 125, a dual brightness enhancement film (DBEF) 127 and a light reflecting film 129. In the embodiment, the light source 121 is adapted to provide a light beam 122. The LGP 123 has a light incident surface 124S and a light emitting surface 124U, and is adapted to guide the light beam 122. The light source 121 is disposed beside the light incident surface 124S of the LGP 123. The light beam 122 enters the LGP 123 through the light incident surface 124S, and leaves the LGP 123 through the light emitting surface 124U. The light turning film 125 is disposed above the LGP 123. The DBEF 127 is disposed on the light turning film 125. In the embodiment, the light turning film 125 has a light incident surface S1, where the light incident surface S1 faces to the light emitting surface 124U of the LGP 123, and is adapted to guide the light beam 122 leaving the LGP 123 through the light emitting surface 124U to enter the light turning film 125 through the light incident surface S1. The light incident surface S1 includes a plurality of first optical microstructures 126A and a plurality of second optical microstructures 126B. The first optical microstructures 126A and the second optical microstructures 126B are adapted to change a light propagating direction of the light beam 122. Moreover, in the embodiment, the LGP 123 includes a plurality of third optical microstructures 128. The third optical microstructures 128 and the light reflecting film 129 are adapted to change the light propagating direction of the light beam 122 in the LGP 123, so as to transmit the light beam 122 entering the LGP 123 from the light incident surface 124S towards the light turning film 125 and the DBEF 127 along a direction D1.

In the embodiment, the display panel 110 is, for example, a liquid crystal display panel, though in other embodiments, the display panel 110 may be implemented by any display panel of the related technical field, which is not limited by the invention. Therefore, those skilled in the art may learn enough instructions and recommendations for the display panel 110, the structure and the implementation thereof from general knowledge of the related technical field, and detailed description thereof is not repeated. Moreover, in the embodiment, the light source module 120 implemented by a side type light source module is taken as an example for description, though the invention is not limited thereto. In an embodiment, the light source module may also be implemented by a direct type or a mixed type light source module, and those skilled in the art may learn enough instructions and recommendations for the structure and the implementation thereof from general knowledge of the related technical field, and detailed description thereof is not repeated.

Figure 2:
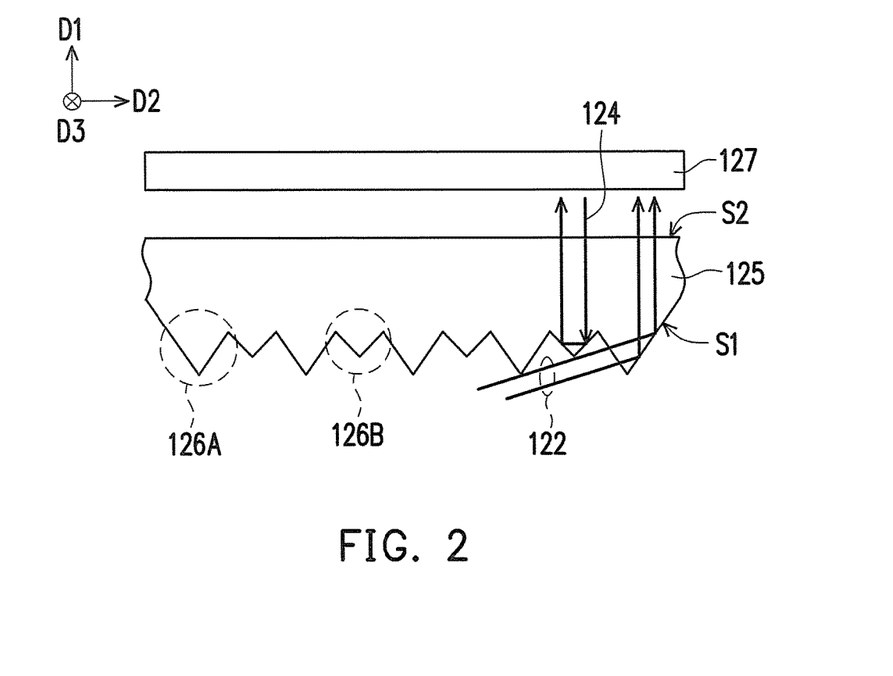
FIG. 2 is a schematic diagram of a light turning film and a dual brightness enhancement film (DBEF) of the embodiment of FIG. 1.

FIG. 2 is a schematic diagram of the light turning film and the DBEF of the embodiment of FIG. 1. Referring to FIG. 1 and FIG. 2, the light turning film 125 of the embodiment includes the light incident surface S1 and a light emitting surface S2. The light incident surface S1 includes a plurality of the first optical microstructures 126A and a plurality of the second optical microstructures 126B. The light incident surface S1 is adapted to guide the light beam 122 to enter the light turning film 125 through the light incident surface S1. The light emitting surface S2 is disposed opposite to the light incident surface S1, and is adapted to guide the light beam 122 to leave the light turning film 125 through the light emitting surface S2.

To be specific, in the embodiment, each of the first optical microstructures 126A is adapted to change a light propagating direction of the light beam 122 coming from the LGP 123, so as to transmit the light beam 122 coming from the LGP 123 to the DBEF 127 along the direction D1. The DBEF 127 is pervious to a part of the light beam 122 coming from the light turning film 125, and is adapted to reflect a part of the light beam 122 coming from the light turning film 125 to form a reflected light beam 124, and transmits the reflected light beam 124 to the light turning film 125, where a transmitting direction of the reflected light beam 124 is substantially opposite to the direction D1. In the embodiment, each of the second optical microstructures 126B is adapted to change a light propagating direction of the reflected light beam 124 coming from the DBEF 127, so as to transmit the reflected light beam 124 coming from the DBEF 127 to the DBEF 127 along the direction D1.

In the embodiment, the first optical microstructures 126A and the second optical microstructures 126B are, for example, prism-shaped optical microstructures, though the shape thereof is not limited by the invention. In an embodiment, the first optical microstructures 126A and the second optical microstructures 126B may also be convex cylindrical optical microstructures, which are not limited by the invention. In the embodiment, the first optical microstructures 126A and the second optical microstructures 126B are periodically arranged in interleaving, and one second optical microstructure 126B is arranged between every two of first optical microstructures 126A, though the arranging method and the numbers thereof are not limited by the invention. In an embodiment, a plurality of the second optical microstructures 126B may be arranged between every two of the first optical microstructures 126A, and the numbers of the second optical microstructures 126B arranged between every two of the first optical microstructures 126A may be the same or different, which is not limited by the invention.

In an exemplary embodiment of the invention, structural parameters of each optical microstructure include a height, a vertex angle, a projection width of the optical microstructure on a reference plane of the light turning film 125, and a projection area of the optical microstructure on a reference plane of the light turning film 125. These structural parameters are complied with predetermined conditions, so that an optical luminance of the light source module 120 is increased, and power consumption thereof is decreased.

Figure 3A:
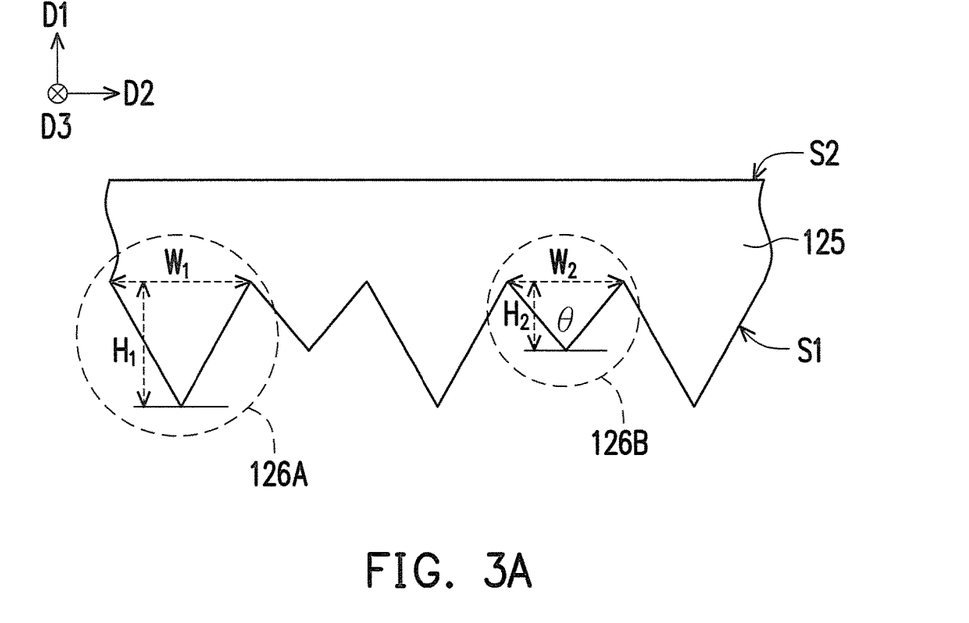
FIG. 3A-FIG. 3C are respectively schematic diagrams of structural parameters of the light turning film of the embodiment of FIG. 2.
Figure 3B:
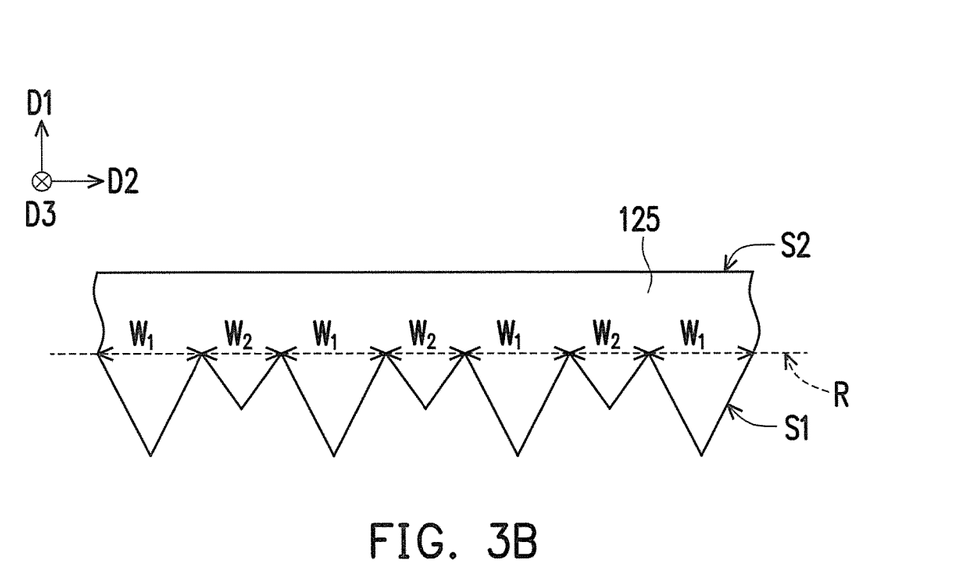
Figure 3C:
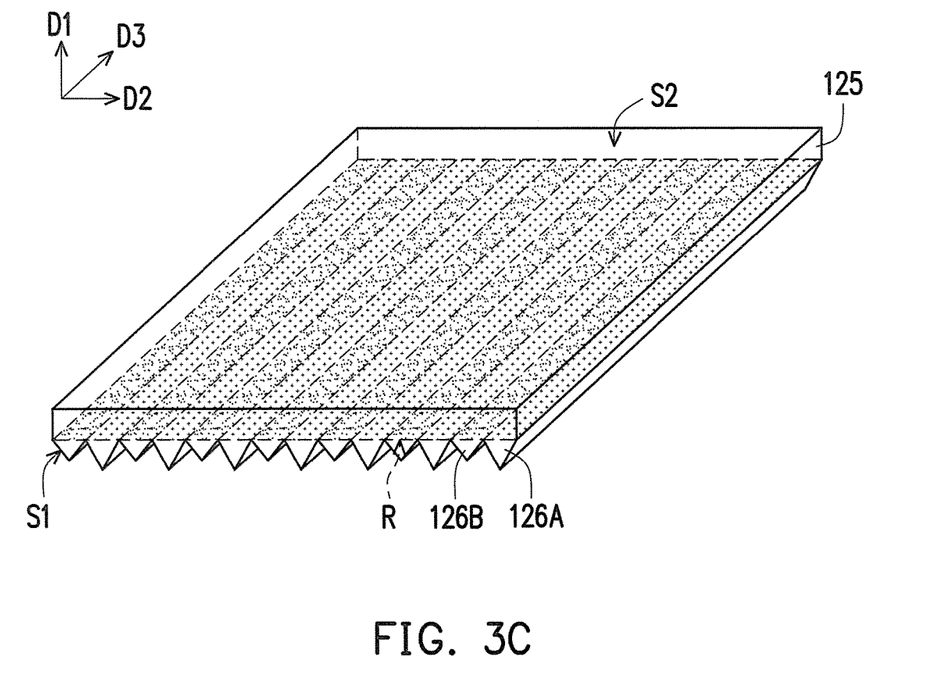

FIG. 3A-FIG. 3C are respectively schematic diagrams of the structural parameters of the light turning film of the embodiment of FIG. 2. Referring to FIG. 3A to FIG. 3C, in the embodiment, the first optical microstructures 126A and the second optical microstructures 126B protrude outward from the light turning film 125 with reference of a reference plane R. After the light source module 120 is assembled, the first optical microstructures 126A and the second optical microstructures 126B, for example, protrude towards the LGP 123. Moreover, in the embodiment, the first optical microstructures 126A and the second optical microstructures 126B are periodically arranged in interleaving on the reference plane R. Moreover, one second optical microstructure 126B is arranged between every two of the first optical microstructures 126A, though the arranging method and the numbers thereof are not limited by the invention.

In the embodiment, each of the first optical microstructures 126A and each of the second optical microstructures 126B is complied with conditions of $$0 < H2 \leq \frac{2}{3}H1$$

and 80 degrees≤θ≤100 degrees, where H1 is a height of each of first optical microstructures 126A protruding out of the reference plane R, H2 is a height of each of second optical microstructures 126B protruding out of the reference plane R, and θ is a vertex angle of each of second optical microstructures. In an embodiment, each of the first optical microstructures 126A and each of the second optical microstructures 126B are, for example, complied with a first condition of $$H2 = \frac{1}{2}H1.$$

Alternatively, in an embodiment, each of the second optical microstructures 126B is complied with a second condition of θ=90 degrees. In the exemplary embodiment of the invention, each of the first optical microstructures 126A and each of the second optical microstructures 126B may be simultaneously complied with all of or complied with one of the first condition and the second condition, which is not limited by the invention.

In the embodiment, in view of the protruding height, the heights H1 of each of the first optical microstructures 126A protruding out of the reference plane R are equivalent, and the heights H2 of each of the second optical microstructures 126B protruding out of the reference plane R are equivalent, as shown in FIG. 3B, though the invention is not limited thereto. In an embodiment, the heights H1 of each of the first optical microstructures 126A protruding out of the reference plane R may be not equivalent, and the heights H2 of each of the second optical microstructures 126B protruding out of the reference plane R may be not equivalent. Moreover, in the embodiment, the vertex angles θ of each of the second optical microstructures 126B are equivalent, as shown in FIG. 3B, though the invention is not limited thereto. In an embodiment, the vertex angles θ of each of the second optical microstructures 126B may be not equivalent.

In the embodiment, in view of a sum of projection areas, the first optical microstructures 126A and the second optical microstructures 126B are complied with a condition of 0<A2≤2A1, where A1 is a sum of projection areas of each of the first optical microstructures 126A on the reference plane R, and A2 is a sum of projection areas of each of the second optical microstructures 126B on the reference plane R, as shown in FIG. 3C. In an embodiment, the first optical microstructures 126A and the second optical microstructures 126B are complied are complied with a condition of A1=A2.

In the embodiment, in view of an individual projection area of the optical microstructure, as shown in FIG. 3C, extending lengths of each of the first optical microstructures 126A and each of the second optical microstructures 126B along a direction D3 are equivalent, so that as shown in FIG. 3B, in the exemplary embodiment that projection widths W1 of each of the first optical microstructures 126A on the reference plane R are equivalent, projection areas of each of the first optical microstructures 126A on the reference plane R are equivalent. Moreover, in the exemplary embodiment, projection widths W2 of each of the second optical microstructures 126B on the reference plane R are equivalent, projection areas of each of the second optical microstructures 126B on the reference plane R are equivalent, though the invention is not limited thereto. In an embodiment, the projection areas of each of the second optical microstructures 126B on the reference plane R may be not equivalent. In this case, the projection widths W2 of each of the second optical microstructures 126B on the reference plane R are different.

Figure 4:
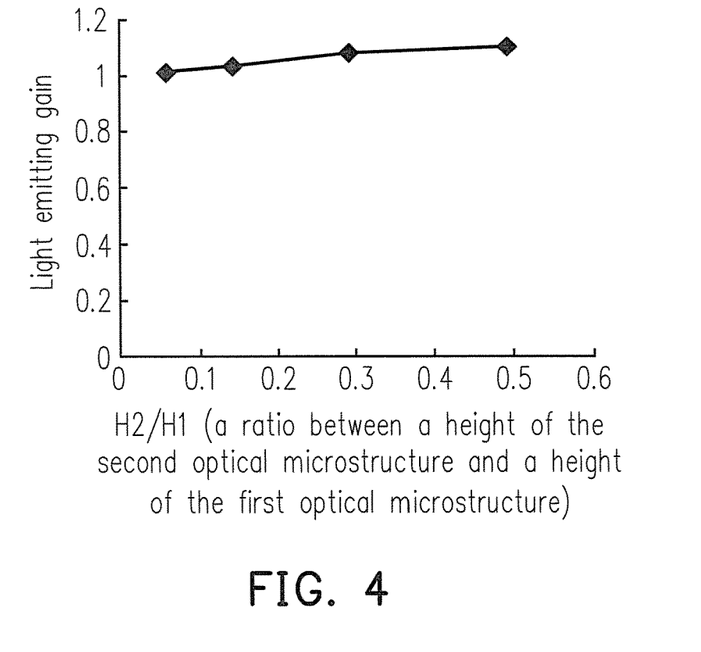
FIG. 4 to FIG. 6 are simulated data diagrams of structural parameters of optical microstructures and light emitting gains of a light source module according to an embodiment of the invention.
Figure 5:
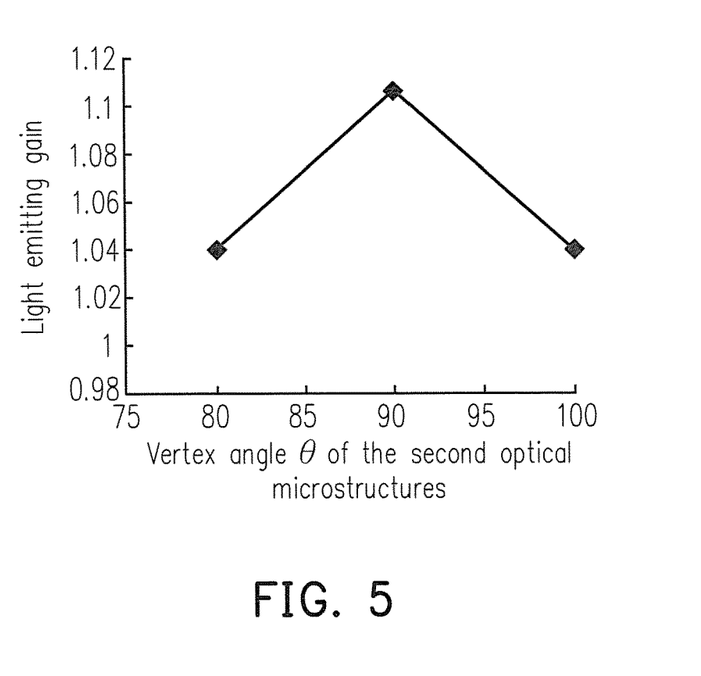
Figure 6:
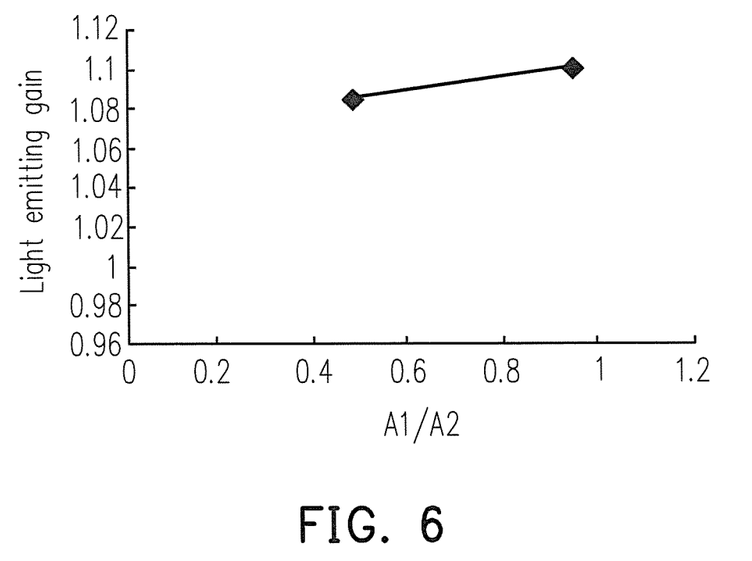

FIG. 4 to FIG. 6 are simulated data diagrams of structural parameters of optical microstructures and light emitting gains of the light source module according to an embodiment of the invention. Referring to FIG. 4 to FIG. 6, FIG. 4 is a diagram illustrating a relationship between the light emitting gains of the light source module 120 and different height ratios H2/H1 of the second optical microstructures 126B and the first optical microstructures 126A. FIG. 5 is a diagram illustrating a relationship between the light emitting gains of the light source module 120 and different vertex angles θ of the second optical microstructures 126B. FIG. 6 is a diagram illustrating a relationship between the light emitting gains of the light source module 120 and different ratios A1/A2 between a sum of projection areas of the first optical microstructures 126A and a sum of projection areas of the second optical microstructures 126B. According to the result shown in FIG. 4 to FIG. 6, it is known that the relationships are all within a standard range. Therefore, the structural parameters of the light turning film 125 of the embodiment are complied with the predetermined conditions, the light turning film 125 avails improving the optical luminance of the light source module 120 and decreasing the power consumption thereof.

Figure 7:
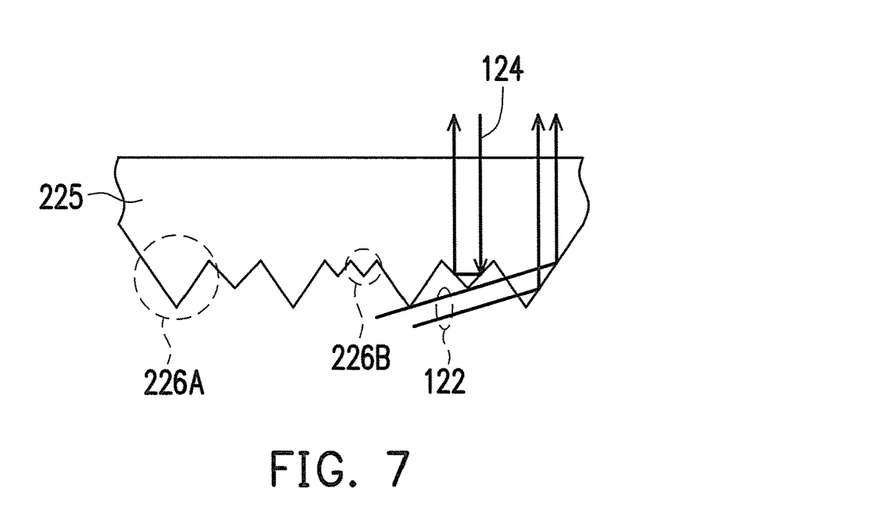
FIG. 7 is a schematic diagram of a light turning film according to another embodiment of the invention.

FIG. 7 is a schematic diagram of a light turning film according to another embodiment of the invention. Referring to FIG. 2 and FIG. 7, the light turning film 225 of the embodiment is similar to the light turning film 125 of FIG. 2, and a main difference therebetween is that in the light tuning film 225, one to a plurality of second optical microstructures 226B is arranged between every two of the first optical microstructures 226A, and the number of the second optical microstructures 226B arranged between every two of the first optical microstructures 226A may be different. Moreover, those skilled in the art may learn enough instructions and recommendations for the structure and the optical characteristics of the light turning film 225 from the embodiments of FIG. 1 to FIG. 6, and detailed description thereof is not repeated.

Figure 8:
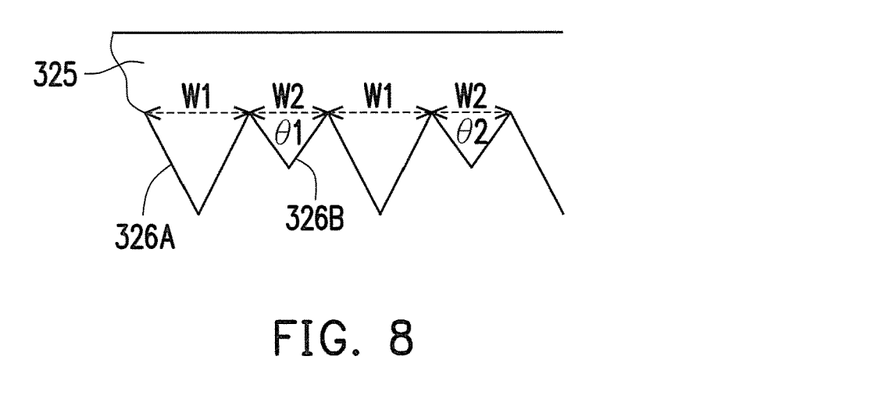
FIG. 8 is a schematic diagram of a light u g film according to another embodiment of the invention.

FIG. 8 is a schematic diagram of a light turning film according to another embodiment of the invention. Referring to FIG. 2 and FIG. 8, the light turning film 325 of the embodiment is similar to the light turning film 125 of FIG. 2, and a main difference therebetween is that in the light turning film 325, the vertex angles θ1 and θ2 of the second optical microstructures 326B are different. Moreover, those skilled in the art may learn enough instructions and recommendations for the structure and the optical characteristics of the light turning film 325 from the embodiments of FIG. 1 to FIG. 6, and detailed description thereof is not repeated.

Figure 9:
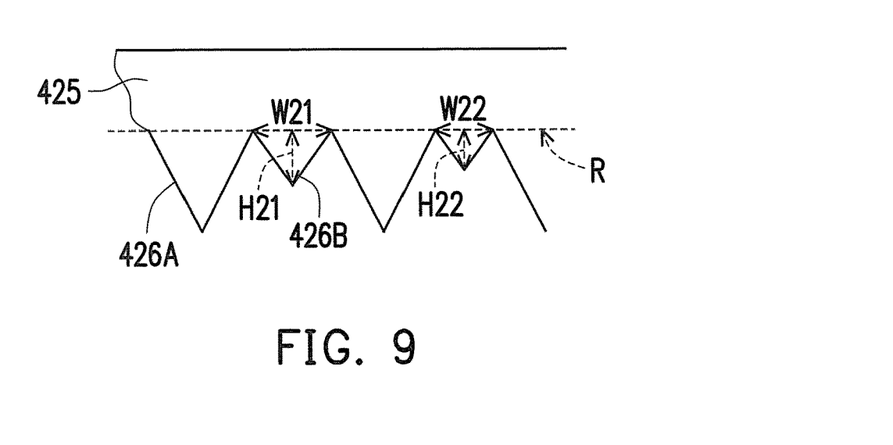
FIG. 9 is a schematic diagram of a light turning film according to another embodiment of the invention.

FIG. 9 is a schematic diagram of a light turning film according to another embodiment of the invention. Referring to FIG. 2 and FIG. 9, the light turning film 425 of the embodiment is similar to the light turning film 125 of FIG. 2, and a main difference therebetween is that in the light turning film 425, the heights H21 and H22 of the second optical microstructures 426B protruding out of the reference plane R are different. Moreover, the projection widths W21 and W22 of the second optical microstructures 426B on the reference plane R are different. In addition, those skilled in the art may learn enough instructions and recommendations for the structure and the optical characteristics of the light turning film 425 from the embodiments of FIG. 1 to FIG. 6, and detailed description thereof is not repeated.

In summary, the embodiments of the invention have at least one of the following advantages or effects. The structure parameters of the optical microstructure include a height, a vertex angle and a projection width and a projection area on the reference plane of the light turning film. The structure parameters are complied with the predetermined conditions, so that the light turning film may improve the optical luminance of the light source module to decrease the power consumption thereof.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light turning film, comprising:
a light incident surface, comprising a plurality of first optical microstructures and a plurality of second optical microstructures, protruding outward from the light turning film with reference of a reference plane, and adapted to guide a light beam to enter the light turning film through the light incident surface; and
a light emitting surface, disposed opposite to the light incident surface, and adapted to guide the light beam to leave the light turning film through the light emitting surface,
wherein each of the first optical microstructures and each of the second optical microstructures are configured such that $$0 < H2 \leq \frac{2}{3}H1$$

and 80 degrees≤θ≤100 degrees,
wherein H1 is a height of each of the first optical microstructures protruding out of the reference plane, H2 is a height of each of the second optical microstructures protruding out of the reference plane, and θ is a vertex angle of each of the second optical microstructures.

2. The light turning film as claimed in claim 1, wherein the first optical microstructures and the second optical microstructures are configured such that 0<A2≤2A1, wherein A1 is a sum of projection areas of each of the first optical microstructures on the reference plane, and A2 is a sum of projection areas of each of the second optical microstructures on the reference plane.

3. The light turning film as claimed in claim 1, wherein heights of each of the first optical microstructures protruding out of the reference plane are equivalent.

4. The light turning film as claimed in claim 1, wherein one or a plurality of the second optical microstructures is arranged between every two of the first optical microstructures.

5. The light turning film as claimed in claim 1, wherein the first optical microstructures and the second optical microstructures are prism-shaped optical microstructures.

6. A light source module, comprising:
a light source, adapted to provide a light beam;
a light guide plate, having a light incident surface and a light emitting surface, and adapted to guide the light beam, wherein the light beam enters the light guide plate through the light incident surface, and leaves the light guide plate through the light emitting surface;
a light turning film, disposed above the light guide plate, and comprising a plurality of first optical microstructures and a plurality of second optical microstructures protruding towards the light guide plate from a reference plane; and
a dual brightness enhancement film, disposed on the light turning film,
wherein each of the first optical microstructures and each of the second optical microstructures are configured such that $$0 < H2 \leq \frac{2}{3}H1$$

and 80 degrees≤θ≤100 degrees, wherein H1 is a height of each of the first optical microstructures protruding out of the reference plane, H2 is a height of each of the second optical microstructures protruding out of the reference plane, and θ is a vertex angle of each of the second optical microstructures,
wherein each of the first optical microstructures is adapted to change a light propagating direction of the light beam coming from the light guide plate, so as to transmit the light beam coming from the light guide plate to the dual brightness enhancement film, and the dual brightness enhancement film is adapted to reflect a part of the light beam coming from the light turning film for transmitting to the light turning film, each of the second optical microstructures is adapted to change a light propagating direction of a light beam coming from the dual brightness enhancement film, so as to transmit the light beam coming from the dual brightness enhancement film to the dual brightness enhancement film.

7. The light source module as claimed in claim 6, wherein each of the first optical microstructures and each of the second optical microstructures are configured such that $$H2 = \frac{1}{2}H1.$$

8. The light source module as claimed in claim 6, wherein heights of each of the first optical microstructures protruding out of the reference plane are equivalent.

9. The light source module as claimed in claim 6, wherein heights of each of the second optical microstructures protruding out of the reference plane are equivalent.

10. The light source module as claimed in claim 6, wherein heights of each of the second optical microstructures protruding out of the reference plane are not equivalent.

11. The light source module as claimed in claim 6, wherein each of the second optical microstructures are configured such that θ=90 degrees.

12. The light source module as claimed in claim 6, wherein vertex angles of each of the second optical microstructures are not equivalent.

13. The light source module as claimed in claim 6, wherein vertex angles of each of the second optical microstructures are equivalent.

14. The light source module as claimed in claim 6, wherein the first optical microstructures and the second optical microstructures are periodically arranged in interleaving on the reference plane.

15. The light source module as claimed in claim 6, wherein one or a plurality of the second optical microstructures is arranged between every two of the first optical microstructures.

16. A display apparatus, comprising a display panel and the light source module as claimed in claim 6, wherein the display panel is adapted to display an image, and the light source module is adapted to provide the light beam to serve as a display light source of the display panel.

17. The light source module as claimed in claim 6, wherein the first optical microstructures and the second optical microstructures are configured such that $0<A2\leq 2A1$, wherein A1 is a sum of projection areas of each of the first optical microstructures on the reference plane, and A2 is a sum of projection areas of each of the second optical microstructures on the reference plane.

18. The light source module as claimed in claim 17, wherein the first optical microstructures and the second optical microstructures are configured such that $A1=A2$.

19. The light source module as claimed in claim 17, wherein projection areas of each of the first optical microstructures on the reference plane are equivalent.

20. The light source module as claimed in claim 17, wherein projection areas of each of the second optical microstructures on the reference plane are equivalent.

21. The light source module as claimed in claim 17, wherein projection areas of each of the second optical microstructures on the reference plane are not equivalent.

* * * * *